3,486,909
PRESERVATION OF CHEESE
Erich Lück, Frankfurt am Main, Germany, assignor to Farbwerke Hoechst Aktiengesellschaft vormals Meister Lucius & Bruning, Frankfurt am Main, Germany, a corporation of Germany
No Drawing. Filed Apr. 25, 1966, Ser. No. 544,842
Claims priority, application Germany, May 17, 1965, F 46,068
Int. Cl. A23c 19/16
U.S. Cl. 99—162                                    1 Claim

ABSTRACT OF THE DISCLOSURE

Cheese is preserved with a suspension of calcium sorbate which is prepared by mixing, while stirring continuously, an aqueous solution of potassium sorbate with an aqueous solution of calcium chloride. The cheese is coated with the suspension of calcium sorbate by immersing it therein.

---

The present invention relates to a process for treating foodstuffs to be stored for a prolonged period of time.

Sorbic acid and the salts thereof including calcium sorbate, are used for many years for preserving foodstuffs. In most cases the preserving agent is simply added to the foodstuff to be preserved. When a direct incorporation of the preserving agent is technically difficult or food regulations only permit a treatment of the surface, it is likewise possible to apply the preserving agent to the packing material. With many foodstuffs, for example hard cheese or hard sausage, coating compositions are used which contain the preserving agents. Packing materials containing sorbic acid or calcium sorbate are also known.

A process is known for preserving foodstuffs to be stored for a prolonged period of time (months), preferably hard cheese, which comprises dipping the foodstuffs into an aqueous suspension of calcium sorbate and a thickening agent, and drying them.

The present invention provides a process for preserving foodstuffs to be stored for a prolonged period of time (months), preferably hard cheese, with aqueous suspensions containing calcium sorbate, which comprises dipping the said foodstuffs into an aqueous suspension of calcium sorbate which is obtained by reacting an aqueous solution of a physiologically unobjectionable water-soluble salt of sorbic acid, preferably potassium sorbate or sodium sorbate, with an aqueous solution of a physiologically unobjectionable water-soluble calcium salt, preferably calcium chloride, and contains 4 to 15% and advantageously 8 to 11% by weight of calcium sorbate.

Compared with sorbic acid calcium sorbate offers some surprising advantages. Owing to its solubility properties its effect lasts for a longer period of time than that of sorbic acid or another physiologically unobjectionable salt of sorbic acid. Calcium sorbate can therefore be considered a "depot form" of sorbic acid which is especially suitable for treating foodstuffs that are to be stored for a prolonged period of time.

It is sometimes desirable to treat the surface of cheese without using a thickening agent, for example when the time required for drying the cheese is thereby prolonged to an undesired extent.

The preserving agent according to the invention which does not contain a thickening agent, is in many cases very simple to use, for example with some types of cheese, because it dries in a very short period of time. Moreover, it can be used on a larger scale for reasons of food regulations than the known preserving agents and the manufacture is simple and cheap.

The aqueous suspension containing calcium sorbate and used in the process of the invention is obtained by double reaction of aqueous solutions of metal sorbates with aqueous solutions of calcium salts. In the preferred reaction of potassium sorbate with calcium chloride potassium chloride is formed besides calcium sorbate. When sodium sorbate is used instead of potassium sorbate common salt is formed in addition to calcium sorbate. Either chloride is physiologically harmless and can, therefore, remain in the immersion suspension. Instead of calcium chloride physiologically unobjectionable calcium salts of other acids may be used, especially of organic acids, for example calcium acetate. The salts obtained in addition to calcium sorbate must also be physiologically unobjectionable. The sorbates and calcium salts used for the double reaction are suitably soluble in water to an extent such that at room temperature their aqueous solutions, prior to mixing them, contain sorbate and calcium ions in an amount corresponding to a content of 4 to 15% by weight of calcium sorbate in the suspension obtained after mixing the solutions.

The by-products potassium chloride and sodium chloride, which alone do not have an antimicrobe action or compared with sorbic acid and the salts thereof have a minor action only, obviously intensify the effect of calcium sorbate as in practical tests the preserving agents according to the invention surprisingly proved to be more effective than those containing only calcium sorbate as preserving agent. Moreover, with the same content of calcium sorbate the suspensions according to the invention have a lower tendency to sedimentation than suspensions of dry calcium sorbate in solutions of thickening agents. This technical effect appears to be especially surprising because it should be expected that thickening agents maintain substances in suspension for a longer period of time than salt solutions.

A further advantage of the preserving agents according to the invention without thickening agent over the known preparations resides in their improved rheological properties. They dry very rapidly so that the treated cheese can be immediately transported to the ripening rooms. Compared with the use of compositions containing thickening agents and having a higher viscosity, the agents according to the invention permit to save considerable time.

It has surprisingly been found that only calcium sorbate suspensions having the specified concentration of effective ingredient, preferably about 10% by weight, are useful in practice. Compositions having a lower concentration of calcium sorbate do not offer any noticeable advantages over potassium sorbate solution and tend to sedimentation. Compositions having a higher content of calcium sorbate are unsuitable for use as immersion baths for mechanical and rheological reasons.

The foodstuffs which have been preserved with the suspensions according to the invention are more stable than foodstuffs treated with known preserving agents. Hard cheese, for example, is stable for many months.

The following examples serve to illustrate the invention but they are not intended to limit it thereto.

EXAMPLE 1

An immersion bath was prepared as follows:

11.5 kilograms of potassium sorbate were dissolved in 64 liters of warm water and, separately,
4.3 liters of anhydrous calcium chloride were dissolved in 20 liters of water.

The two solutions were combined while continuously stirring. The suspension obtained contained about 10% of calcium sorbate and some potassium chloride. Hard cheese was dipped into the suspension and then stored in a ripening room.

EXAMPLE 2

Provolone cheese was compacted and salted and was then dipped for 10 to 15 seconds in a suspension prepared as described in Example 1, dried and further treated in usual manner.

After the treatment the cheese was allowed to ripen for 3 months in the usual ripening rooms.

There was used as control samples cheese of the same production which had not been treated, or which had been treated with immersion baths containing as active ingredient the same amount of potassium sorbate or finely powdered sorbic acid. In each test 10 whole cheese having a weight of about 2 kilograms were used. The cheese was stored for a prolonged period of time.

|  | Number of mouldy whole cheese after (weeks)— | | | | | |
|---|---|---|---|---|---|---|
|  | 1 | 3 | 5 | 8 | 10 | 12 |
| Untreated control samples | 1 | 6 | 10 | 10 | 10 | 10 |
| Cheese treated with sorbic acid |  |  |  | 1 | 3 | 4 |
| Cheese treated with potassium sorbate |  |  |  | 3 | 3 | 3 |
| Cheese treated with calcium sorbate |  |  |  |  |  | 1 |

What is claimed is:

1. A process for coating cheese which is to be stored for a prolonged period of time with a suspension of preservative, comprising the steps of: forming a first solution of potassium sorbate in warm water; forming a second solution of calcium chloride in warm water, said first and second solutions being of such concentration as to form, when mixed, a suspension of calcium sorbate of from 8% to 11% by weight of solution; combining said first and second solutions while stirring continuously to form such suspension; and coating said cheese with the suspension so formed by immersing it therein.

References Cited

UNITED STATES PATENTS

| 2,974,046 | 3/1961 | Perry et al. | 99—162 |
| 3,139,378 | 6/1964 | Gooding | 99—150 X |
| 3,275,454 | 9/1966 | Winterberg | 99—166 X |
| 3,365,488 | 1/1968 | Fernholz et al. |  |

A. LOUIS MONACELL, Primary Examiner

D. M. NAFF, Assistant Examiner

U.S. Cl. X.R.

99—150, 154, 166